Patented Mar. 11, 1941

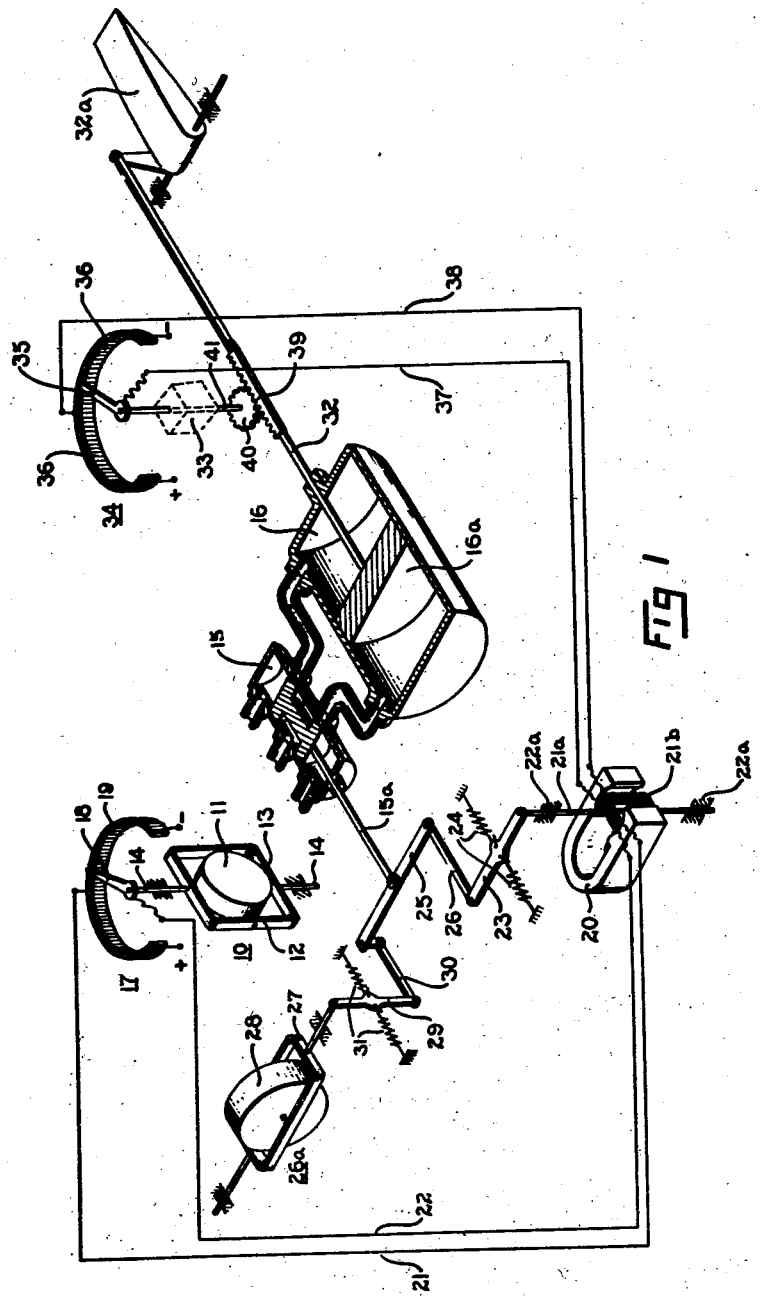

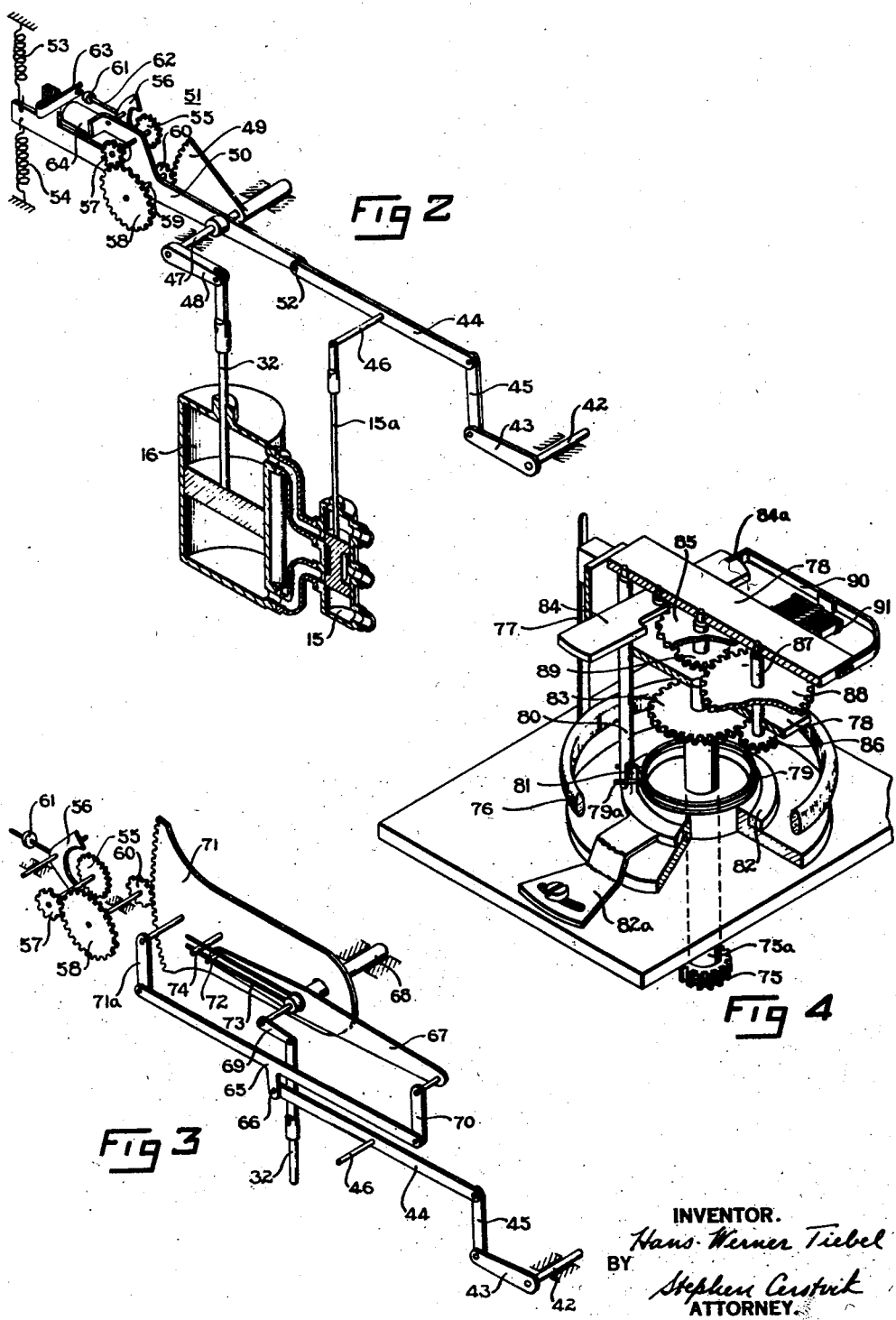

2,234,326

UNITED STATES PATENT OFFICE 2,234,326

YIELDING FOLLOW-UP CONTROL

Hans-Werner Tiebel, Berlin-Spandau, Germany, assignor to Siemens Apparate und Maschinen Gesellschaft mit beschränkter Haftung, Berlin, Germany, a corporation of Germany Application November 9, 1939, Serial No. 303,692
In Germany October 5, 1938

16 Claims. (Cl. 121—41)

This invention relates to control devices, and more particularly to control devices for producing a yielding follow-up action for servo-motors.

Devices heretofore proposed of the above character have been employed for controlling servomotors which govern the control surfaces of vehicles such as aircraft. The yielding quality of the follow-up action of these previously proposed devices has been produced by interposing suitable resilient or yielding means between the servomotor and a control unit therefor. The yielding means, which are known as "isodromic apparatus," have comprised, for example, a dash-pot including a cylindrical member having therein a piston member, one of said members being operatively connected to a resilient member such as a spring which is distortable by the follow-up motion. A displacement of the two members relative to one another takes place under the action of the resilient member when the latter is distorted. A suitable liquid or fluid medium is contained by the cylindrical member and is able to flow therefrom through a valve or regulator simultaneously with the action of the resilient member. A yielding follow-up device of this type is disclosed in Patent No. 2,051,837 to Eduard Fischel, dated August 25, 1936.

Isodromic apparatus of this type, particularly when used in aircraft, possess a number of disadvantages, for example, the cylindrical member must be absolutely fluid tight so that there will be no leakage therefrom. Also the fluid should have a uniform temperature in order to avoid changes in viscosity thereof which can have a very detrimental effect on the steering operation of the device. It is very difficult, particularly in aircraft, to maintain a uniform temperature of such fluid because of the wide range of temperatures to which an aircraft is subject. Special heating apparatus is thus ordinarily required to keep the fluid temperature consistent. Such heating apparatus is undesirable because of the added weight and expense thereof.

One of the objects of the present invention is to provide novel means for producing a yielding follow-up action for a servo-motor which are light in weight and inexpensive to manufacture.

Another object is to provide novel servo-motor follow-up control means which are not subject to temperature changes and which require a minimum of attention for the efficient operation thereof.

An additional object is to provide novel apparatus of the above character having means for adjusting a yielding follow-up action.

The above and further objects and novel features will more fully appear from the detailed description when the same is read in connection with the accompanying drawings. It is to be expressly understood, however, that the drawings are for purposes of illustration only and are not intended as a definition of the limits of the invention, reference for this latter purpose being had to the appended claims.

In the drawings, wherein like reference characters refer to like parts throughout the several views, Figure 1 is an isometric view partly in section of a course control apparatus for an aircraft, with which the present invention is employed;

Figure 2 is an isometric view partly in section of one embodiment of the invention;

Figure 3 is an isometric view of the second embodiment of the invention; and

Figure 4 is an isometric view partly in section and with parts broken away of a third embodiment of the invention.

The forms of the invention illustrated in the accompanying drawings, by way of example, comprise means for controlling the follow-up action of a servo-motor, which motor is in operative connection with the control surfaces of a vehicle such as an aircraft. The novel apparatus is constituted by a power device, i. e., a servo-motor having a member which is movable in response to power movements thereof. A suitable control element is provided for the servo-motor which is governed for example, by primary means comprising a compass. Secondary means which are co-operable with the primary means for governing the control element are provided, comprising means for storing potential energy in response to movements of the above mentioned movable member, means for communicating this potential energy to said control element, and an escapement mechanism for governing the motion of the means for communicating said potential energy.

In the form shown in Fig. 1, an automatic course control device for aircraft is illustrated. The course is controlled by two direction-responsive force transmitters which act independently of one another and simultaneously upon a control element of a servo-motor. One of the above mentioned transmitters is constituted, for example, by an azimuth gyro 10, having a rotor in a housing 11, which is mounted upon trunnions 12 in a gimbal ring 13, the latter having vertical trunions 14 which are mounted in a conventional manner. The azimuth gyro is operatively interconnected with a control element 15 of a servo-motor 16 by means of a conventional potentiometer and rotary magnet. A potentiometer 17 includes a sliding contact 18 and a resistance 19. A rotary magnet 20 is electrically connected to the potentiometer by means of leads 21 and 22 which are respectively connected to contact 18 and to a predetermined point of the resistance 19. The rotary magnet 20 is provided with an armature 21b having a shaft 21a mounted in bearings 22a. To shaft 21a there is rigidly attached an arm 23 which is resiliently held in a predetermined position by opposed springs 24. Arm 23 is linked to a differential lever 25 by means of an arm 26, the lever 25 being pivotally connected to a control element shaft 15a of the control element 15.

The other of the above mentioned transmitters comprises, for example, a conventional rate-of-turn responsive gyro 26a which is mounted in such a manner that it measures the angular velocity of the aircraft about the axis about which the plane is steered, e. g., the vertical axis. A gimbal frame 27, upon which a rotor 28 of the banking indicator gyro is mounted, is operatively connected to the differential lever 25 by means of arms 29 and 30, the former being held in a centralized position by opposed springs 31.

The servo-motor 16 is provided with a piston 16a having a conventional piston rod 32 which comprises a movable power member, the latter being operatively connected to a control surface 32a. The servo-motor, in the form shown, is of a conventional hydraulic type which receives actuating pressures by means of a suitable fluid from a source (not shown).

The force producing the follow-up action in this servo-motor arrangement is a function of the displacement of the control surface or of the movable power member of the servo-motor, and is governed by means employing a suitable operative interconnection between said movable member and the control element 15, there being interposed in said connection a novel follow-up control device 33, to be described later. The operative interconnection includes a potentiometer apparatus 34 having a movable contact 35 which is slidable upon a resistance 36, the potentiometer being connected to the rotary magnet 20 by means of leads 37 and 38 in a manner analogous to that above described in connection with potentiometer 17. However, the armature electric field produced by the current flowing in leads 37 and 38 is opposite to the armature field produced by the current flowing in leads 21 and 22. The movable contact 35 is being governed by movable member 32 to which it is connected by means of rack 39, pinion 40, and a shaft 41, the above mentioned follow-up control device 33 being interposed, for example, between the shaft 41 and the arm 35.

In the embodiment shown in Fig. 2, a servo-motor having a control element, both of which are similar to that shown in Fig. 1, are in operative connection with suitable governing transmitters (not shown) by means of a shaft 42 to which an arm 43 is rigidly attached and which is linked to a differential lever 44 by means of an arm 45. The lever 44 is in connection with control element shaft 15a by a suitable pin 46. The movable member 32 is operatively connected to the extremity of the lever 44 opposite to that to which arm 45 is connected by means of an angularly shiftable shaft 47 which is angularly shiftable by an arm 48, the latter being pivotally connected to member 32. Rigidly connected to shaft 47 is a member 49 which is operatively connected to a lever 50 by means of an escapement mechanism 51. Lever 50 is angularly shiftable co-axially with shaft 47 and is pivotable thereabout. One extremity of lever 50 is pivotably connected to the above mentioned opposite extremity of differential lever 44 at 52. Lever 50 is resiliently maintained in a predetermined position by means in which potential energy can be stored, and in the form shown by means of opposed springs 53 and 54 which are preferably attached to the extremity of lever 50 opposite to that of the pivotal connection with the lever 44. The above mentioned escapement mechanism 51 is constituted by an escapement wheel 55 and an anchor or claw member 56. The escapement wheel is operatively associated with member 49 by means of a gear train comprising a spur gear 57 upon the same shaft upon which the escapement wheel is mounted, the gear 57 being in mesh with a second gear 58 upon a shaft 59. Upon the latter shaft is a third gear 60 which is in mesh with a toothed portion of member 49, said toothed portion comprising a sector element.

In order to govern the period of oscillation of the anchor or claw member 56 and thus to govern the speed with which the escapement mechanism operates, there is provided suitable means for varying the moment of inertia of said member 56 comprising, for example, a body 61 which is axially adjustable upon a rod 62, the latter being rigidly attached to the claw member 56.

In order to render inoperative the yielding follow-up action of the novel apparatus, locking means are provided for maintaining the anchor 56 in a fixed position. The locking means are constituted, for example, by a forked arm 63 which under the action of an electro-magnet 64 is capable of gripping and holding the rod 62.

In operation, the control forces provided by the governing transmitters are transmitted by means of members 42, 43 and 45 to the differential lever 44 and thence to the control element 15. The pivotal connection 52 can be considered temporarily stationary. Upon displacement of the control element from a zero position, the movable member 32 of the servo-motor will be displaced and will angularly shift the sector element 49. The escapement mechanism at the moment when the angular shifting of member 49 begins approximates a locking device between said member and the lever 50 for the reason that the force of the springs 53 and 54 is so selected as to be less than the force applied to the shaft 47 and gear sector 49 by the servo-motor 16. There occurs no actual locking action between lever 50 and sector member 49 but rather a retarding action is produced on the lever 50 by the escapement mechanism 51 so that lever 50 lags behind sector 49. In other words, the claw member 56 does not permanently engage with gear 55 because said member 56 rocks back and forth on its pivot in the same manner as in a clock escapement. Thus, when the top end of the claw member 56 disengages the gear 55, the bottom end immediately re-engages said gear. As a result, the gear 55 will be turned one tooth at a time by sector 49 through gears 57, 58 and 60 so that a step-by-step rotation of said gear 55 occurs while said claw member 56 rocks on its pivot, but the intermittent engagement of the gear 55 by the member 56 causes a periodic and temporary locking of the gear train, which causes the lever 50 to be moved angularly about the shaft 47 against the force of the springs 53, 54, thereby compressing one of said springs and tensioning the other and moving the pivotal connection 52 in a direction opposite to that of the movement of the pivotal connection between lever 44 and arm 45, thus tending to restore the control element 15 to its initial position to close the valve thereof. The escapement mechanism under the action of one of the distorted resilient elements 53 or 54 now operates and governs the motion of lever 50 as it returns to its initial position in which the resilient elements 53 and 54 exert equal and opposing forces upon the lever.

The return of the lever 50 to its initial position by the springs 53, 54 causes the control element 15 to be actuated so as to reopen the valve thereof in the same sense as it was opened by actuation of the arm 44 by control shaft 42 through links 43, 45, thereby again actuating the servo-motor 16. This action, however, is not intermittent but is continuous and continues until the craft is back on its course and link 43 is returned to its initial position. The escapement mechanism 51 thus functions to control the system in a manner to prevent the craft from oscillating on its course and from going beyond its course as it returns thereto under the control of the directional element 10. The yield-velocity, i. e., the speed of operation of the escapement 51 and, hence, the lag of lever 50 may be adjusted by adjusting the member 61.

A second embodiment of the invention, illustrated in Fig. 3, is constituted by a differential lever 44 similar to the one above described which is operatively connected to governing transmitters by means of members 42, 43 and 45, also as above described. The movable power member 32 is operatively connected to the differential lever by means of a secondary differential lever 65 which is pivotably connected to lever 44 at a point 66 which is analogous to the above mentioned pivotal connection 52. The secondary differential lever 65 is controlled at one extremity by a lever 67 which is rigidly attached to a shaft 68, the latter being angularly shiftable in response to movements of member 32, shaft 68 and member 32 being interconnected by an arm 69 analogous to arm 48 appearing in Fig. 2. Lever 67 is linked to one extremity of lever 65 by means of an arm 70. The opposite extremity of the secondary differential lever is governed by a toothed sector 71, the angular motion of which is regulated by an escapement mechanism which is identical to the mechanism above described, with the exception that the shaft 59, the shaft to which the escapement wheel is secured, and the shaft about which the anchor oscillates, are mounted in fixed bearings. The sector 71 and said opposite extremity of lever 65 are linked together by an arm 71a. An arm of lever 67 opposite to the arm to which element 70 is connected is provided with a post 72 which is interposed between two arms of a resilient forked spring 73. A second post 74 which is rigidly secured to sector 71 also extends between the arms of said forked spring.

In operation the control element 15 is shifted from its initial central position in a manner analogous to that above described in connection with Fig. 2. The movable member 32 immediately is axially displaced and angularly shifts the shaft 68 and therewith lever 67. The latter by means of arm 70 moves one extremity of the secondary differential lever in such a direction that a follow-up action is communicated to the control element, i. e., in a direction opposite to that of the initial movement of the control element as produced by the governing transmitters. The opposite extremity of the secondary differential lever does not immediately move in a direction opposite to that of the movement of the first mentioned extremity thereof, but relatively, slowly moves in this opposite direction under the action of the distorted spring member 73, this movement being governed by the escapement mechanism member 51. The post 72, upon the angularly shifting lever 67, engages one of the arms of the spring 73 and moves the same away from the opposite arm of the pair, said opposite arm being at first prevented from following the other arm by the post 74. Thus, by moving one extremity of the secondary differential lever synchronously with member 32 and moving the opposite extremity of the secondary differential lever in an opposite direction under the action of yielding means, which action is governed by an escapement mechanism, a yielding follow-up action is obtained which is analogous to the follow-up action of the embodiment of Fig. 2.

In Fig. 4, a third embodiment of the invention is illustrated which can be employed with the apparatus shown in Fig. 1. This embodiment is constituted by a pinion 75 analogous to pinion 40 of Fig. 1. Pinion 75 is in mesh with a suitable rack (not shown), the latter being preferably rigidly attached to a movable power member of a servo-motor. Pinion 75 is rigidly secured to a shaft 75a. A potentiometer apparatus having, for example, a resistance 76 and a movable contact arm 77 is provided and is electrically connected to a rotary magnet (not shown) which can be similar to that shown in Fig. 1. The shaft 75a is operatively connected to the arm 77 for shifting the latter relative to the resistance 76, however, interposed between shaft 75a and the arm 77 is a yielding follow-up control device which is substantially equivalent to that shown in Fig. 2. Said device is constituted by a lever member 78, to which the arm 77 is attached, which lever is adapted for angular movement about the axis of shaft 75a, and is preferably mounted for angular movement upon said shaft. Lever member 78, in the form shown, comprises two parallel plates upon which a follow-up mechanism is mounted in a manner to appear later. The lever 78 is resiliently retained in a predetermined angular position relative to the fixed resistance 76, for example, by means of a coil spring 79, which is co-axial with shaft 75a. The spring is provided with arms 79a at each extremity thereof, and interposed between said arms is a finger 80 which is rigidly attached to the lever member 78. In order to fix the above mentioned, predetermined, angular position, a post 81 is interposed between said arms, said post being rigidly held in place, for example, by a ring member 82 co-axial with shaft 75a. Member 82 can be angularly adjusted within predetermined limits by means of an integral arm 82a, having a slot therein through which a suitable adjusting screw extends, the screw engaging a fixed portion of the apparatus. To the portion of shaft 75a immediately beneath the lever 78 is attached a gear 83 which is operatively connected to the above mentioned escapement mechanism which comprises an anchor or claw member 84 and an escapement wheel 85, said anchor and wheel being mounted for angular motion upon suitable shafts which are mounted preferably upon the parallel plates constituting lever 78. This operative connection is constituted by a gear train comprising a spur gear 86 which is secured to a shaft 87, there being a gear 88 upon the latter shaft which is in mesh with a third gear 89. The latter gear is rigidly secured to the shaft upon which the escapement wheel is mounted.

Means are provided for locking the escapement mechanism which are analogous to the means described in connection with Fig. 2, the locking means being constituted by a locking arm 90 which is normally out of engagement with the anchor or claw member 84, but which under the action of an electro-magnet 91 can be brought into engagement therewith, said engagement being accomplished by means of a suitable finger upon the arm 90 which engages, for example, a recess 84a in member 84.

In operation, when the servo-motor is in a centralized and inoperative position, the armature of the rotary magnet is also in a central position. When the craft deviates from a predetermined course, the azimuth gyro and banking indicator will cooperate to displace the control element, the armature of the rotary magnet departing from the above mentioned central position. The power member 32 immediately moves the pinion 75, the escapement mechanism acting momentarily as a locking device in a manner similar to that of the embodiment of Fig. 2. Consequently, the finger 80 is angularly displaced with the lever 78 which moves in response to the movement of shaft 75a. The contact arm 77 which is attached to lever 78 is therefore angularly shifted away from its initial position. Since the finger 80 is thus angularly shifted away from a position adjacent the post 81, the coil spring 79 is distorted and, due to the tension thereof, the lever 78 tends to seek its original position in which the finger 80 was adjacent post 81. The escapement mechanism operates due to the potential energy stored in spring 79 and governs the return motion of the lever 78 and therewith the contact arm 77, and the finger 80, unil the latter had regained its position adjacent post 81.

There is thus provided novel means for governing the follow-up action of a servo-motor apparatus. The novel means are extremely simple in construction and inexpensive to manufacture, are light in weight, and are therefore well adapted for use aboard vehicles such as aircraft. The novel apparatus is not subject to fluctuation in temperature, and the speed of operation can be easily adjusted between wide limits. Furthermore, the novel follow-up control device, for example, enables automatic course control apparatus to govern the attitude of an aircraft very smoothly and with a minimum of zig-zagging from the desired path.

Although only three embodiments of the present invention have been illustrated and described in detail, it is to be expressly understood that the invention is not limited thereto. For example, instead of employing a hydraulic servo-motor, any other suitable variety of servo-motor, for example, one energized by electricity, may be employed. Furthermore, any suitable means in which potential energy may be stored, the energy in said means being yieldingly releasable, can be employed instead of springs herein described. Various changes can be made in the design and arrangement of the parts without departing from the spirit and scope of the invention as the same will now be understood by those skilled in the art. For a definition of the limits of the invention, reference will be had primarily to the appended claims.

What is claimed is:

1. In apparatus of the type employing a power device having a movable member and control means for the power device, the combination therewith of means for actuating the control means to render the power means operable, escapement means for controlling the return movement of the control means, and resilient means tensionable by the power means for actuating the escapement means.

2. In apparatus of the class described, a power device having a movable member control means for the device, primary means for governing the control means, an element operatively connected to the control means, an escapement mechanism mounted upon the element, means for operatively interconnecting said member and escapement mechanism, and means for storing potential energy in response to the movement of said element from a predetermined position, said last named means being operatively associated with the last named element.

3. In apparatus of the class described, a power device having a movable member, control means for the power device, primary means for governing the control means, and secondary means co-operable with the primary means for governing said control means comprising means for storing potential energy in response to movement of said member, means for communicating to said control means the energy stored in the means for storing potential energy, an escapement mechanism for governing the speed of the means for communicating potential energy, and means for locking said escapement mechanism.

4. In apparatus of the class described, a power device having a movable member, control means for the power device, primary means for governing the control means, and secondary means co-operable with the primary means for governing said control means comprising means for storing potential energy in response to movement of said member, means for communicating the energy stored in the last named means to said control means, and an escapement mechanism for governing the speed of the means for communicating said potential energy.

5. In apparatus of the class described, a power device having a movable member, control means for the device, primary means for governing the control means, and secondary means cooperable with the primary means for governing the control means comprising resilient means tensionable in response to movement of said member, means for communicating the energy of the resilient means to said control means, and an escapement mechanism for governing the motion of said means for communicating the energy of the resilient means.

6. In apparatus of the class described, a power device having a movable member, control means for the device, primary means for governing the control means, and means for yieldingly counteracting the effect of the primary means comprising resilient means tensionable in response to movement of said member, means for communicating the energy of the distortable resilient means to said control means, and an escapement mechanism for governing the motion of said means for communicating the energy of the distortable resilient means.

7. The combination with an angularly shiftable shaft of means for angularly shifting the shaft, control means for the first named means, means for moving said control means operable simultaneously with the movement of said first named means, and means for yieldingly counteracting the effect of the means for moving said control means including resilient means tensionable by movement of the first named means, an element for communicating the energy of the resilient means to the means for moving the control means, and an escapement mechanism for governing the speed of said element.

8. In a lever apparatus, an angularly shiftable shaft, a lever pivotally mounted upon said shaft, means for resiliently retaining the lever in a predetermined position, an escapement mechanism mounted upon said lever, and means for operatively interconnecting said shaft and escapement mechanism.

9. In apparatus of the class described, a power device having a movable member, a control element for said device, primary means for governing said control element, an escapement mechanism comprising a wheel and an anchor operatively associated therewith, said movable member being operatively connected to said escapement mechanism, resilient means operatively associated with the escapement mechanism for actuating the latter when the resilient means are tensioned, said resilient means being tensionable in response to the movement of said member, and means operable in response to the movement of said member for returning the control element to a predetermined position, the movement of the last named means being governable by said escapement mechanism.

10. In apparatus of the class described, force exerting means having a movable member, a control element for the force exerting means, primary governing means for said element, an escapement mechanism, said movable member being operatively connected with the escapement mechanism, resilient means operatively associated with the escapement mechanism for actuating the latter when changed from a predetermined condition, the condition of said resilient means being changeable in response to movement of said movable member from a predetermined position, and means operable in response to the movement of said member for returning the control element to a predetermined position, the movement of the last named means being governable by said escapement mechanism.

11. In apparatus of the class described, a power device having a movable power member, a control element for said device, primary means for controlling said element, an escapement mechanism, said power member being operatively connected with the escapement mechanism, resilient means operatively associated with the escapement mechanism for actuating same when changed from a predetermined condition, the condition of said resilient means being changeable in response to movement of the power member from a predetermined position, and means the movement of which is governable by said escapement mechanism for moving the control element in a direction opposite to that induced by the primary means.

12. In apparatus of the class described, a power device having a movable power member, a control element for the device, primary means for governing the control element, means for yieldingly moving the control element to a predetermined position in response to movement of the power member, said last named means including an escapement mechanism interposed in an operative interconnection between the power member and the control element, and resilient means stressable by movement of the power member, said resilient means being operatively connected to the escapement mechanism for actuating the same when distorted.

13. In apparatus of the class described, a power device having a movable power member, a control element for said device, primary means for governing the control element, means operable in response to movement of the power member for moving the control element in a direction opposite to the movement thereof induced by the primary means, means also operable in response to movement of the power member for moving the control element in the same direction as the movement thereof induced by the primary means including resilient means stressable in response to movement of said power member, said resilient means urging the control element in the last named direction when stressed, and an escapement mechanism for controlling the speed of the means for moving the control element in the same direction as the movement of the element induced by the primary means.

14. In apparatus of the class described, power means having a movable power member, a control element for the power means, primary governing means for the control element, an arm operatively connected to said control element, means for pivotally mounting the arm, means for resiliently retaining the arm in a predetermined position, an escapement mechanism mounted on the arm and a member mounted for angular movement co-axially with said arm, said member being angularly shiftable in response to movements of the power member and being operatively connected to said escapement mechanism.

15. In apparatus of the class described, power means having a movable power member, a control element for the power means, primary governing means for the control element, and follow-up means for governing the control element, said primary and follow-up means acting in conjunction one with the other, the follow-up means comprising means responsive to the movement of said power member, a member operatively connected to the control element, an escapement mechanism mounted upon the member, said escapement mechanism being operatively connected to the means responsive to movement of the power member, and resilient means for urging said member towards a predetermined position.

16. In apparatus of the class described, power means having a movable member, a control element for the power means, primary governing means for the control element, means for operatively interconnecting the control element and said power member including a resilient member tensionable by the movement of the power member, and an escapement mechanism operable when the resilient member is under tension for governing the speed of operation of the means for operatively interconnecting the control element and power member.

HANS-WERNER TIEBEL.